July 16, 1957 T. S. DONNELLY, JR 2,799,771
ELECTRODE HOLDER
Filed May 11, 1955 3 Sheets-Sheet 1

INVENTOR.
Thomas S. Donnelly Jr
BY
ATTORNEY

July 16, 1957 T. S. DONNELLY, JR 2,799,771
ELECTRODE HOLDER

Filed May 11, 1955 3 Sheets-Sheet 2

INVENTOR.
Thomas S. Donnelly Jr
BY
Thos S Donnelly
ATTORNEY

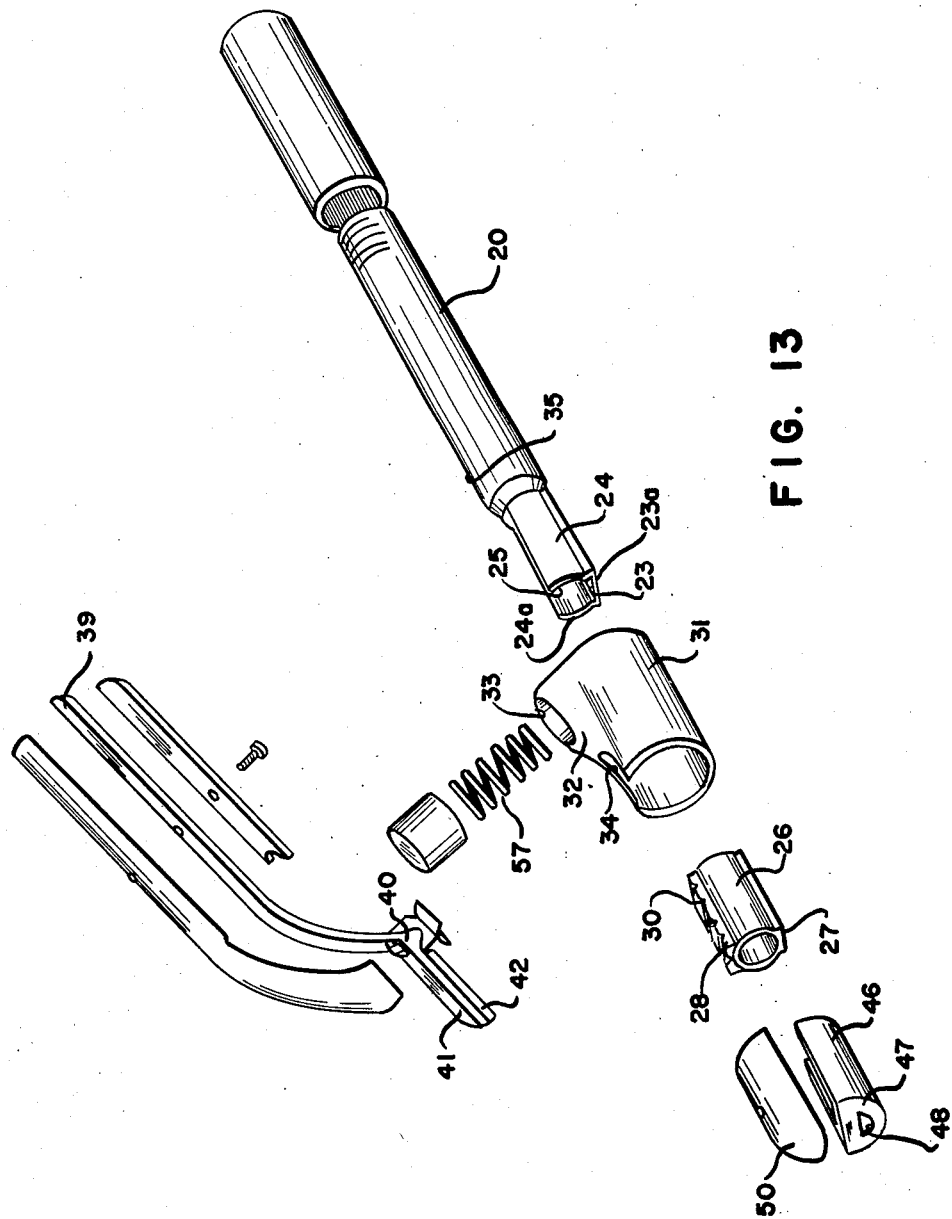

United States Patent Office 2,799,771
Patented July 16, 1957

2,799,771

ELECTRODE HOLDER

Thomas S. Donnelly, Jr., Detroit, Mich.

Application May 11, 1955, Serial No. 507,575

17 Claims. (Cl. 219—138)

My invention relates to a new and useful improvement in an electrode holder used in electric arc welding.

Such electrode holders have a pair of jaws which are relatively movable and are forced into approach to grip the electrode or welding rod between the same. One of these jaws is connected to one end of a welding circuit, the work piece being connected to the opposite end of the welding circuit.

An undesirable feature found in most electrode holders is that the parts are usually permanently connected together, or connected in such a manner that, after use, the connections become of a permanent nature. The result is that it is difficult, and in many cases impossible, to remove worn-out parts and replace the same with new parts.

It is an object of the present invention to provide an electric holder so constructed and arranged that the various parts may be easily and quickly detached and replaced with other parts.

Another object of the present invention is the provision of an electrode holder so constructed and arranged that, when assembled, the various parts cooperate for retaining each other in operative position.

In an electrode holder of this class there is usually a metal jaw retainer which it is desired to cover with insulation, and where a coil spring is used, telescoping cups are commonly used for enclosing the coil spring. It is an object of the present invention to provide in an electrode holder a part which will serve to enclose and insulate a portion of the jaw retainer and will also have formed integral thereon a socket for reception of the spring.

Another object of the invention is the provision of an electrode holder so constructed and arranged that it will be possessed of minimum dimensions from top to bottom.

Another object of the invention is the provision of an electrode holder which will be cool and highly efficient in use, economically manufactured, durable, and of light weight.

Other objects will appear hereinafter.

It is recognized that various modifications and changes may be made in the details of the structure illustrated without departing from the invention, and it is intended that the present disclosure shall be considered to be but the preferred embodiment.

Forming a part of this invention are drawings in which,

Fig. 13 is an exploded view of the invention, showing the various parts in separated relation.

Figure 1:
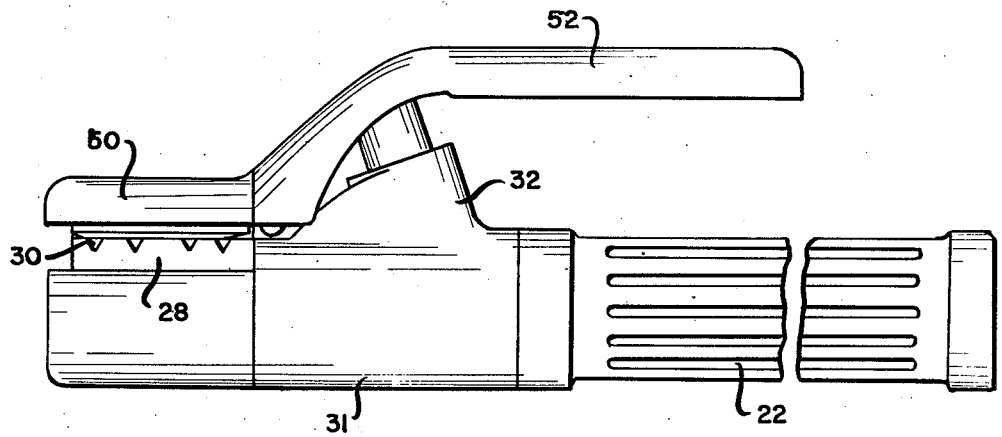
Fig. 1 is a side elevational view of the invention.
Figure 2:
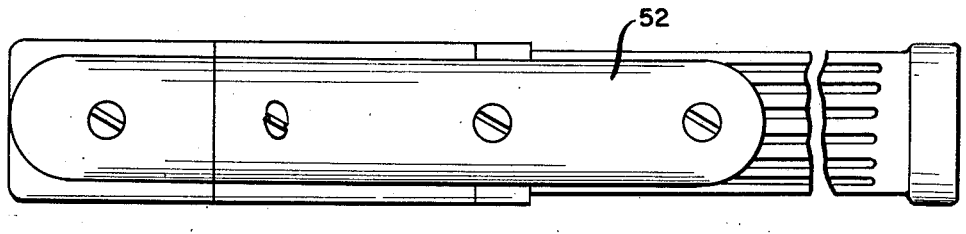
Fig. 2 is a top plan view of the invention.
Figure 4:
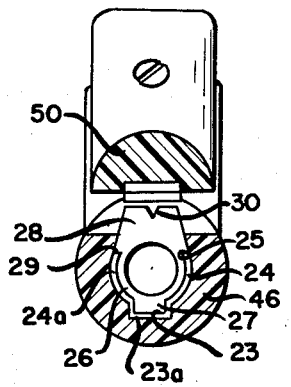
Fig. 4 is a sectional view taken on line 4—4 of Fig. 3.
Figure 5:
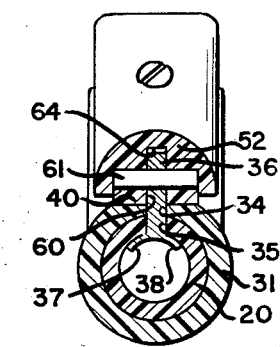
Fig. 5 is a sectional view taken on line 5—5 of Fig. 3.

In the drawings I have illustrated the invention comprising a handle 22, which is formed from suitable insulating material, and which is threaded on the threaded end 21 of a tubular metallic jaw retainer 20. This jaw retainer is provided at its forward end with the outwardly bulged portion 23a to provide a channel 23. The forward end of the jaw retainer 20 is also longitudinally slit as at 25 to provide a trough-shaped structure embodying the oppositely disposed walls 24 and 24a. Slidable in this trough-shaped structure is the tubular metallic member 26, having the outwardly bulged portion 27 which slides in the channel 23 and which is provided on its upper end with a jaw or electrode engaging portion 28 having at opposite sides the undercuts 29 which engage the edges of the trough walls 24 and 24a.

On the upper face of the engaging portion 28 are grooves 30, in which the electric welding rod may be positioned. Embracing a portion of the metallic tube 20 is a tube 31 of insulating material, on the upper end of which is the outwardly projecting boss 32 having the socket 33 formed therein. On the upper side of the member 31, extending rearwardly from the forward end thereof, is a slot 34 which is in alignment with the slot 35 formed in the tubular jaw retainer 20 rearwardly of the slotted portion 25 on the forward end thereof.

Projected through the slots 34 and 35 is a lug 36 which carries on its lower end the arms 37 and 38 which extend outwardly from opposite sides of the slot 35 formed in the jaw retainer 20. This lug 36 also extends through a slot 60 formed in the member 40, which will be explained hereinafter.

A trigger or lever 39, which is formed from metal, is provided with outwardly offset curved portion 40, extending forwardly from which is a plate 41 carrying a jaw 42 secured thereto by the pins 43. This jaw 42 serves to cooperate with the jaw 28 for clamping an electrode placed between the jaws.

In use, a cable 44 is projected through the handle 22 and inserted into the tubular jaw retainer 20 so that the bared end 45 thereof terminates within the jaw 26. Screws 44a are threaded into the enlarged portion 27 of the jaw 26 to force a presser clip 45a against the bared end 45 of the cable 44 so as to force the same into tight contact with the upper surface of the tubular member 26.

A trough-shaped piece 46 of insulating material is slid on to the tubular member 26 and is provided with a forward wall 47 in which is provided a peek opening 48 so that the bared end 45 of the cable 44 may be visible through this peek opening 48. A screw 49, threaded in the enlarged portion 27 of the member 26, serves to retain this insulating body 46 in position on the retainer 20, the screw 23 being projected through the outwardly bulged portion 23a.

Figure 3:
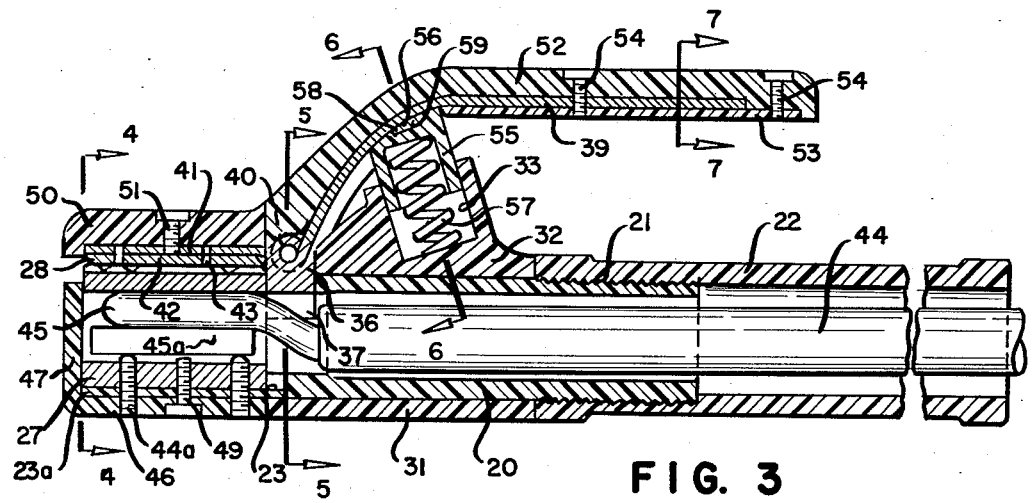
Fig. 3 is a vertical, longitudinal, central, sectional view of the invention, with parts broken away.
Figure 6:
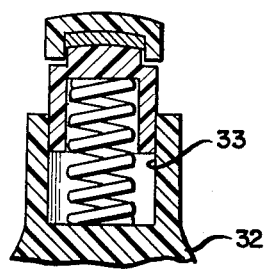
Fig. 6 is a fragmentary sectional view taken on line 6—6 of Fig. 3.
Figure 7:
Fig. 7 is a sectional view taken on line 7—7 of Fig. 3.
Figure 8:
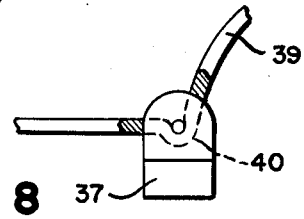
Fig. 8 is a fragmentary side elevational view of a part, with parts broken away and parts shown in section.
Figure 9:
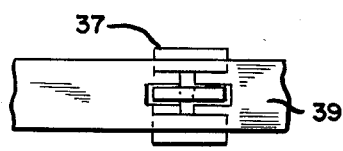
Fig. 9 is a top plan view of the section shown in Fig. 8.
Figure 10:
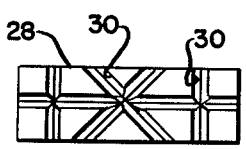
Fig. 10 is a top plan view of a jaw used in the invention.
Figure 11:
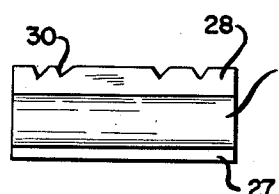
Fig. 11 is a side elevational view of the jaw shown in Fig. 10.
Figure 12:
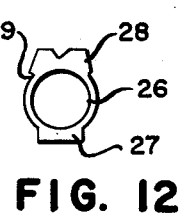
Fig. 12 is a front elevational view of the jaw shown in Fig. 10.

It will be noted from Fig. 3 that the rear end of the member 32 engages the forward end of the handle 22, and that the rear end of the insulating member 46 engages the forward end of the member 31 so as to retain these parts in fixed relative position. The lug 36 engages the rear end of the slot 34 and also is engaged at its forward side by the rear end of the jaw 28.

A plate 50 of insulating material serves to fit over the plate 41 and is secured in position thereon by means of the screw 51. This plate at its rear end engages the forward end of an insulating layer 52 which is secured over the member 39 so as to cover the upper side thereof. The lower side of the member 39 is covered by an insulating plate 53, these plates 52 and 53 being held in position by means of screws 54. A cup 55 engages at its upper end the face of the member 39, the upper end of this cup being curved as at 56 to conform to the curvature of the member 39. This cup 55 is slidably projected into the socket 33 so as to cover the coil spring 57 positioned in the socket.

A boss or tit 58 projects from the member 39 and engages in a recess 59 formed in the face 56 of the cup 55.

A pin 61 is projected through the lug 36 which extends into a slot 64 formed in the insulating plate 52. Consequently, the curved portion 40 of the upper trigger or lever 39 underlies the pin 61. In a rocking movement this member 39 will rock on the pin 61 as a pivot, and the spring 57 will normally tend to maintain the jaw 42 moved into electrode clamping relation with the jaw 28.

The construction is such that when the lug 36 is assembled in relation to the member 39, as shown in Fig. 3, and the parts 50, 42, 52, 53 and 55 are in the position shown in Fig. 3, the lug 36 may be slid rearwardly in the slot 34. A positioning of the member 26 and the insulating member 46 into position will serve to retain these parts in assembled relation. Thereupon, the cup 55 may be placed into embracing relation with the spring 57 and the assembly of the parts completed as shown in Fig. 3.

It is believed obvious that all that is required to disassemble the mechanism would be to remove the insulating member 46 and the jaw carrying portion 26, whereupon the upper jaw and trigger may be moved forward of the portion 23a, and the jaw retainer and the entire holder thus completely disassembled. In this way it is possible to construct a holder in which the various parts may be easily and quickly assembled and disassembled.

What I claim is:

1. In an electrode holder of the class described, a tubular handle-supporting member open at the upper side of its forward end to provide a trough-shaped terminal portion; a tubular handle mounted on the opposite end of said handle supporting member and projecting rearwardly therefrom; a tubular insulating member mounted on said handle supporting member and engageable at its rear end with the forward end of said handle and terminating at its forward end rearwardly of the forward end of said trough-shaped portion; a boss projecting upwardly from said tubular insulating member and having a socket formed in its upper end; an electrode engaging jaw embodying a tubular portion and having at its upper side a planar portion projecting at opposite sides outwardly from the sides of said tubular portion and having an upper surface for engaging an electrode and insertable into said trough-shaped portion of said handle-supporting member and engageable at its rear end with the forward end of said tubular insulating member, said tubular insulating member having a rearwardly extending slot formed in the upper surface of its forward end; a lug projecting outwardly through the said slot; a pair of laterally extending projections on said lug and engaging the inner surface of the forward end of said handle supporting member; a lever rockably mounted intermediate its ends on the outwardly projecting portion of said lug and projecting forwardly therefrom and upwardly and rearwardly thereof for overlying a portion of said handle, the forward end of said lever overlying said jaw; a cooperating electrode jaw mounted on the forward end of said lever; and a spring positioned at one end in said socket and exerting an upward thrust on said lever for moving said jaws into engagement.

2. In an electrode holder of the class described, a tubular handle supporting member open at the upper side of its forward end to provide a trough-shaped terminal portion; a tubular handle mounted on the opposite end of said handle supporting member and projecting rearwardly therefrom; a tubular insulating member mounted on said handle supporting member and engageable at its rear end with the forward end of said handle and terminating at its forward end rearwardly of the forward end of said trough-shaped portion; a boss projecting upwardly from said tubular insulating member and having a socket formed in its upper end; an electrode engaging jaw embodying a tubular portion and having at its upper side a planar portion projecting at opposite sides outwardly from the sides of said tubular portion and having an upper surface for engaging an electrode and insertable into said trough-shaped portion of said handle-supporting member and engageable at its rear end with the forward end of said tubular insulating member, said tubular insulating member having a rearwardly extending slot formed in the upper surface of its forward end; a lug projecting outwardly through the said slot; a pair of laterally extending projections on said lug and engaging the inner surface of the forward end of said handle supporting member; a lever rockably mounted intermediate its ends on the outwardly projecting portion of said lug and projecting forwardly therefrom and upwardly and rearwardly thereof for overlying a portion of said handle, the forward end of said lever overlying said jaw; a cooperating electrode jaw mounted on the forward end of said lever; a spring positioned at one end in said socket and exerting an upward thrust on said lever for moving said jaws into engagement; a trough-shaped insulating member slidable at one end over said jaw bearing tubular member; and an insulating member for covering the top and sides of the forward portion of said lever.

3. In an electrode holder of the class described, a tubular handle supporting member having the upper surface removed adjacent the forward end to provide at the forward end a trough-shaped portion, there being a slot extending rearwardly of said member from the rear end of said open side of said trough-shaped portion; a handle mounted on said supporting member and terminating at its forward end rearwardly of the rear end of said slot and extending rearwardly from the rear end of said supporting member; a tubular insulating member slidable on to the handle supporting member from the forward end thereof and having formed in its upper surface at its forward end and proceeding rearwardly therefrom an elongated slot registrable with the slot in said handle supporting member, the rear end of said insulating member being engageable with an abutment of said handle supporting member; a lug projecting outwardly of said registering slots and terminating at its inner end in said handle supporting member; a portion of the inner end of said lug extending laterally therefrom for overlying the slot in said handle supporting member and engaging the inner surface of said handle supporting member; a lever pivotally mounted intermediate its ends on the outer end of said lug and projecting forwardly and rearwardly therefrom; an electrode engaging jaw on the forward end of said lever; and an electrode engaging jaw carried by the trough-shaped portion of said handle supporting member in substantial alignment with the jaw of said lever.

4. In an electrode holder of the class described, a tubular handle supporting member having the upper surface removed adjacent the forward end to provide at the forward end a trough-shaped portion, there being a slot extending rearwardly of said member from the rear end of said open side of said trough-shaped portion; a handle mounted on said supporting member and terminating at its forward end rearwardly of the rear end of said slot and extending rearwardly from the rear end of said supporting member; a tubular insulating member slidable on to the handle supporting member from the forward end thereof and having formed in its upper surface at its forward end and proceeding rearwardly therefrom an elongated slot registrable with the slot in said handle supporting member, the rear end of said insulating member being engageable with an abutment of said handle supporting member; a lug projecting outwardly of said registering slots and terminating at its inner end in said handle supporting member; a portion of the inner end of said lug extending laterally therefrom for overlying the slot in said handle supporting member and engaging the inner surface of said handle supporting member; a lever pivotally mounted intermediate its ends on the outer end of said lug and projecting forwardly and rearwardly therefrom; an electrode engaging jaw on the forward end of said lever; an electrode engaging jaw carried by the trough-shaped portion of said handle supporting member in substantial alignment with the jaw of said lever; insulating means for covering the forward end of said lever and the jaw thereon excepting at the face opposed to the jaw of said handle retaining member; and insulating means mounted on said second named jaw for covering the sides and front thereof.

5. In an electrode holder of the class described, a tubular handle supporting member having the upper surface removed adjacent the forward end to provide at the forward end a trough-shaped portion, there being a slot extending rearwardly of said member from the rear end of said open side of said trough-shaped portion; a handle mounted on said supporting member and terminating at its forward end rearwardly of the rear end of said slot and extending rearwardly from the rear end of said supporting member; a tubular insulating member slidable on to the handle supporting member from the forward end thereof and having formed in its upper surface at its forward end and proceeding rearwardly therefrom an elongated slot registrable with the slot in said handle supporting member, the rear end of said insulating member being engageable with an abutment of said handle supporting member; a lug projecting outwardly of said registering slots and terminating at its inner end in said handle supporting member; a portion of the inner end of said lug extending laterally therefrom for overlying the slot in said handle supporting member and engaging the inner surface of said handle supporting member; a lever pivotally mounted intermediate its ends on the outer end of said lug and projecting forwardly and rearwardly therefrom; an electrode engaging jaw on the forward end of said lever; an electrode engaging jaw carried by the trough-shaped portion of said handle supporting member in substantial alignment with the jaw of said lever; insulating means for covering the forward end of said lever and the jaw thereon excepting at the face opposed to the jaw of said handle retaining member; insulating means mounted on said second named jaw for covering the sides and front thereof; and a spring positioned between said first named insulating member and said lever rearwardly of the point of pivot thereof for normally urging said jaws together.

6. In an electrode holder of the class described, a tubular handle supporting member having the upper surface removed adjacent the forward end to provide at the forward end a trough-shaped portion, there being a slot extending rearwardly of said member from the rear end of said open side of said trough-shaped portion; a handle mounted on said supporting member and terminating at its forward end rearwardly of the rear end of said slot and extending rearwardly from the rear end of said supporting member; a tubular insulating member slidable on to the handle supporting member from the forward end thereof and having formed in its upper surface at its forward end and proceeding rearwardly therefrom an elongated slot registrable with the slot in said handle supporting member, the rear end of said insulating member being engageable with an abutment of said handle supporting member; a lug projecting outwardly of said registering slots and terminating at its inner end in said handle supporting member; a portion of the inner end of said lug extending laterally therefrom for overlying the slot in said handle supporting member and engaging the inner surface of said handle supporting member; a lever pivotally mounted intermediate its ends on the outer end of said lug and projecting forwardly and rearwardly therefrom; an electrode engaging jaw on the forward end of said lever; an electrode engaging jaw carried by the trough-shaped portion of said handle supporting member in substantial alignment with the jaw of said lever; insulating means for covering the forward end of said lever and the jaw thereon excepting at the face opposed to the jaw of said handle retaining member; insulating means mounted on said second named jaw for covering the sides and front thereof; a spring positioned between said first named insulating member and said lever rearwardly of the point of pivot thereof for normally urging said jaws together; means for insulating said lever rearwardly of its point of pivot, the rearward end of said second named jaw engaging with said lug and retaining it positioned in the rearward portion of said slots.

7. In an electrode holder of the class described, a tubular handle retainer having its forward end reduced in diameter with the upper side open to provide a trough-shaped structure; a tubular jaw supporting member slidable into said trough-shaped portion from the forward end thereof; an electrode engaging jaw on the upper side of said jaw supporting member and extending outwardly therefrom at opposite sides and overlying the opposite edges of said trough-shaped portion, said jaw being adapted for engaging on its upper face an electrode; a trough-shaped insulating member slidable on to said trough-shaped portion for covering the same; and means for retaining said insulating member and said jaw supporting member in fixed relation to said trough-shaped portion.

8. In an electrode holder of the class described, a tubular handle retainer having its forward end reduced in diameter with the upper side open to provide a trough-shaped structure; a tubular jaw supporting member slidable into said trough-shaped portion from the forward end thereof; an electrode engaging jaw on the upper side of said jaw supporting member and extending outwardly therefrom at opposite sides and overlying the opposite edges of said trough-shaped portion, said jaw being adapted for engaging on its upper face an electrode; a trough-shaped insulating member slidable on to said trough-shaped portion for covering the same; means for retaining said insulating member and said jaw supporting member in fixed relation to said trough-shaped portion; a tubular insulating member mounted on said handle retainer and covering a portion thereof rearwardly of said reduced portion; abutment means engaging said tubular insulating member for preventing movement of the same rearwardly of said handle retainer, said handle retainer having on its upper face rearwardly of said reduced portion a longitudinally directed slot and said tubular retainer having at its forward end on its upper side a rearwardly extending longitudinal slot registering with the slot in said handle retainer; a lug positioned in said slots and projecting outwardly therefrom; engagement means on the inner side of said lug for engaging the inner surface of said handle retainer for preventing radial outward movement of said lug; a lever pivotally mounted on the outer end of said lug and provided with a portion extending rearwardly of said lug and a portion extending forwardly of said lug and overlying said jaw; an electrode engaging jaw mounted on the forwardly extending portion of said lever and overlying said first named jaw for cooperating therewith in clamping an electrode on said first named jaw; an insulating member mounted on said forwardly projecting portion of said lever for enclosing the same in covering the sides and the front face of the jaw mounted thereon; and a spring positioned between said lever and said tubular insulating member and engaging the same for normally maintaining said lever rocked for retaining the jaw carried by the forward portion of said lever in engagement with the upper face of said first named jaw.

9. In an electrode holder of the class described, a tubular handle retainer having its forward end reduced in diameter with the upper side open to provide a trough-shaped structure; a tubular jaw supporting member slidable into said trough-shaped portion from the forward end thereof; an electrode engaging jaw on the upper side of said jaw supporting member and extending outwardly therefrom at opposite sides and overlying the opposite edges of said trough-shaped portion, said jaw being adapted for engaging on its upper face an electrode; a trough-shaped insulating member slidable on to said trough-shaped portion for covering the same; means for retaining said insulating member and said jaw supporting member in fixed relation to said trough-shaped portion; a tubular insulating member mounted on said handle retainer and covering a portion thereof rearwardly of said reduced portion; abutment means engaging said tubular insulating member for preventing movement of the same rearwardly of said handle retainer, said handle retainer having on its upper face rearwardly of said reduced portion a longitudinally directed slot and said tubular retainer having at its forward end on the upper side a rearwardly extending longitudinal slot registering with the slot in said handle retainer; a lug positioned in said slots and projecting outwardly therefrom; engagement means on the inner side of said lug for engaging the inner surface of said handle retainer for preventing radial outward movement of said lug; a lever pivotally mounted on the outer end of said lug and provided with a portion extending rearwardly of said lug and a portion extending forwardly of said lug and overlying said jaw; an electrode engaging jaw mounted on the forwardly extending portion of said lever and overlying said first named jaw for cooperating therewith in clamping an electrode on said first named jaw; an insulating member mounted on said forwardly projecting portion of said lever for enclosing the same in covering the sides and the front face of the jaw mounted thereon; a spring positioned between said lever and said tubular insulating member for engaging the same for normally maintaining said lever rocked for retaining the jaw carried by the forward portion of said lever in engagement with the upper face of said first named jaw; and means for insulating the rearwardly extending portion of said lever.

10. In an electrode holder of the class described, a tubular handle retainer having its forward end reduced in diameter with the upper side open to provide a trough-shaped structure; a tubular jaw supporting member slidable into said trough-shaped portion from the forward end thereof; an electrode engaging jaw on the upper side of said jaw supporting member and extending outwardly therefrom at opposite sides and overlying the opposite edges of said trough-shaped portion, said jaw being adapted for engaging on its upper face an electrode; a trough-shaped insulating member slidable on to said trough-shaped portion for covering the same; means for retaining said insulating member and said jaw supporting member in fixed relation to said trough-shaped portion; a tubular insulating member mounted on said handle retainer and covering a portion thereof rearwardly of said reduced portion; abutment means engaging said tubular insulating member for preventing movement of the same rearwardly of said handle retainer, said handle retainer having on its upper face rearwardly of said reduced portion a longitudinally directed slot and said tubular retainer having at its forward end on the upper side a rearwardly extending longitudinal slot registering with the slot in said handle retainer; a lug positioned in said slots and projecting outwardly therefrom; engagement means on the inner side of said lug for engaging the inner surface of said handle retainer for preventing radial outward movement of said lug; a lever pivotally mounted on the outer end of said lug and provided with a portion extending rearwardly of said lug and a portion extending forwardly of said lug and overlying said jaw; an electrode engaging jaw mounted on the forwardly extending portion of said lever and overlying said first named jaw for cooperating therewith in clamping an electrode on said first named jaw; an insulating member mounted on said forwardly projecting portion of said lever for enclosing the same in covering the sides and the front face of the jaw mounted thereon; a spring positioned between said lever and said tubular insulating member for engaging the same for normally maintaining said lever rocked for retaining the jaw carried by the forward portion of said lever in engagement with the upper face of said first named jaw; means for insulating the rearwardly extending portion of said lever; said tubular insulating member having a boss projecting upwardly from its upper surface provided with a bore, one end of said spring engaging in said bore; and an insulating cup-shaped member for receiving the opposite end of said spring and bearing against the lower surface of said lever.

11. In an electrode holder of the class described, a tubular handle retainer having its forward end reduced in diameter with the upper side open to provide a trough-shaped structure; a tubular jaw supporting member slidable into said trough-shaped portion from the forward end thereof; an electrode engaging jaw on the upper side of said jaw retaining member and extending outwardly therefrom at opposite sides and overlying the opposite edges of said trough-shaped portion, said jaw being adapted for engaging on its upper face an electrode; a trough-shaped insulating member slidable on to said trough-shaped portion for covering the same; means for retaining said insulating member and said jaw supporting member in fixed relation to said trough-shaped portion; a tubular insulating member mounted on said handle retainer and covering a portion thereof rearwardly of said reduced portion; abutment means engaging said tubular insulating member for preventing movement of the same rearwardly of said handle retainer, said handle retainer having on its upper face rearwardly of said reduced portion a longitudinally directed slot and said tubular retainer having at its forward end on the upper side a rearwardly extending longitudinal slot registering with the slot in said handle retainer; a lug positioned in said slots and projecting outwardly therefrom; engagement means on the inner side of said lug for engaging the inner surface of said handle retainer for preventing radial outward movement of said lug; a lever pivotally mounted on the outer end of said lug and provided with a portion extending rearwardly of said lug and a portion extending forwardly of said lug and overlying said jaw; an electrode engaging jaw mounted on the forwardly extending portion of said lever and overlying said first named jaw for cooperating therewith in clamping an electrode on said first named jaw; an insulating member mounted on said forwardly projecting portion of said lever for enclosing the same in covering the sides and the front face of the jaw mounted thereon; a spring positioned between said lever and said tubular insulating member for engaging the same for normally maintaining said lever rocked for retaining the jaw carried by the forward portion of said lever in engagement with the upper face of said first named jaw; means for insulating the rearwardly extending portion of said lever; said tubular insulating member having a boss projecting upwardly from its upper surface provided with a bore, one end of said spring engaging in said bore; and a cup-shaped member for receiving the opposite end of said spring and bearing against the lower surface of said lever; said bore being inclined forwardly of the axis of said handle retainer, and said cup telescoped in said bore and engaging said lever forwardly of the forward end of the insulation on the lower surface thereof and engaging at its periphery said forward end of said insulation on the lower surface of said lever.

12. In an electrode holder of the class described, a tubular handle retainer having a longitudinally directed slot formed in its upper surface; a jaw retaining portion forwardly of said slot; a jaw on said jaw retaining portion and having a face for engaging an electrode; a lug projecting upwardly from said slot, said lug having on its inner end a laterally projecting portion extending beyond said slot and engaging the inner surface of said handle retainer; a lever pivotally mounted on the upper end of said lug and having a portion extending rearwardly therefrom and a portion extending forwardly therefrom; an electrode engaging portion on said forwardly projecting portion of said lever and overlying said jaw for clamping an electrode on the electrode engaging face of said jaw.

13. In an electrode holder, an electrode engaging jaw and embodying a tubular portion and a planar portion on the upper side of said tubular portion having its opposite edges projecting outwardly from the tubular portion; and a longitudinally extending outwardly bulged portion on the bottom side of said tubular portion.

14. In an electrode holder, an electrode engaging jaw and embodying a tubular portion and a planar portion on the upper side of said tubular portion having its opposite edges projecting outwardly from the tubular portion; a longitudinally extending outwardly bulged portion on the bottom side of said tubular portion; and said outwardly bulged portion being provided with a portion of greater thickness than the wall thickness of the tubular portion.

15. An electrode holder of the class described comprising: a tubular handle supporting member having a retained portion at its forward end and provided on its upper side rearwardly of said reduced portion with a longitudinally directed slot; an electrode engaging jaw having a portion for engaging an electrode mounted on said reduced portion and projecting outwardly therefrom at opposite sides thereof; a tubular insulating handle mounted on said handle retainer; an insulating member embracing said reduced portion and having its outer surface flush with the outer surface of said handle; a tubular insulator on said handle retainer forwardly of said handle and engaging at its rear end the forward end of said handle and at its forward end the rearward end of said insulation on said jaw retaining portion.

16. An electrode holder of the class described comprising: a tubular handle supporting member having a reduced portion at its forward end and provided on its upper side rearwardly of said reduced portion with a longitudinally directed slot; an electrode engaging jaw having a portion for engaging an electrode mounted on said reduced portion and projecting outwardly therefrom at opposite sides thereof; a tubular insulating handle mounted on said handle supporting member; an insulating member embracing said reduced portion and having its outer surface flush with the outer surface of said handle; a tubular insulator on said handle forwardly of said handle and engaging at its rear end the forward end of said handle and at its forward end the rear end of said insulation on said reduced portion; a boss projecting upwardly from said tubular insulator and having a bore formed therein, and having at its forward end a longitudinally directed slot in alignment with the slot in said handle retainer, and a boss projecting through said slots; means on said boss projecting laterally therefrom for engaging the inner surface of said handle retainer, said insulator engaging at its forward end with said boss and said jaw engaging at its rearward end with said boss for retaining said boss longitudinally fixed relatively to said handle retainer; a lever pivotally mounted intermediate its ends on said lug having a portion extending upwardly therefrom and a portion extending forwardly therefrom and overlying said jaw; a spring engageable at one end in the bore of said boss; a cup for receiving the opposite end of said spring and engaging the under surface of said lever for normally rocking the forward portion thereof toward said jaw; and an electrode engaging portion on the forward portion of said lever for clamping an electrode against the electrode engaging surface of said jaw.

17. In an electrode holder having a tubular retainer for retaining a jaw at the forward end thereof and a handle mounted on the rear end thereof; a tubular insulating member mounted thereon between the forward end of said handle and the rear end of said jaw; and a hollow boss projecting upwardly from the upper side of said insulating member.

References Cited in the file of this patent

UNITED STATES PATENTS

| | | |
|---|---|---|
| 2,003,196 | Jackson | May 28, 1935 |
| 2,695,944 | Donnelly | Nov. 30, 1954 |